United States Patent [19]

Lamson

[11] 4,171,119
[45] Oct. 16, 1979

[54] FLUID FLOW VALVE STEM

[76] Inventor: William C. Lamson, 125 Far Mill St., Huntington, Conn. 06484

[21] Appl. No.: 844,630

[22] Filed: Oct. 25, 1977

[51] Int. Cl.² ............................................. F16K 1/00
[52] U.S. Cl. .................................. 251/321; 251/367; 137/223
[58] Field of Search ............................ 137/223, 234.5; 220/354, 355; 206/524.8; 285/331; 251/321, 367

[56] References Cited

U.S. PATENT DOCUMENTS

| 632,218 | 8/1899 | Goss | 137/234.5 X |
| 1,367,815 | 2/1921 | Henemier | 137/234.5 |
| 1,509,916 | 9/1924 | Waite | 206/524.8 X |
| 2,095,912 | 10/1937 | Boyd | 137/223 |
| 2,447,697 | 8/1948 | Gotschall | 285/331 X |
| 2,782,909 | 2/1957 | McNamara | 220/355 X |
| 2,822,817 | 2/1958 | Benzel | |
| 2,874,750 | 2/1959 | Boyer | |
| 2,928,448 | 3/1960 | Hosking | |
| 3,032,091 | 5/1962 | McCord | |
| 3,280,879 | 10/1966 | Simms | |
| 3,318,325 | 5/1967 | Siedow | 137/234.5 |
| 3,355,056 | 11/1967 | Fisch | 220/355 |
| 3,368,603 | 2/1968 | Kuzyn | |
| 3,383,006 | 5/1968 | Knize | 220/355 |
| 3,712,326 | 1/1973 | Thacker | 137/223 |
| 3,741,267 | 6/1973 | Thacker | |

Primary Examiner—Harold W. Weakley

[57] ABSTRACT

A fluid flow valve stem for a vessel, tire, or the like comprising a sleeve having an inner annular valve seat, an end cap secured to one end of the sleeve by a vacuum lock, and a captive plunger interposed between the valve seat and end cap, and having a seal member biased by a spring into engagement with the valve seat. The sleeve is encapsulated within a polymeric body which is securable to a vessel, tire wheel, or the like. Alternatively, the end cap may be directly secured to an inner tube or the like.

3 Claims, 7 Drawing Figures

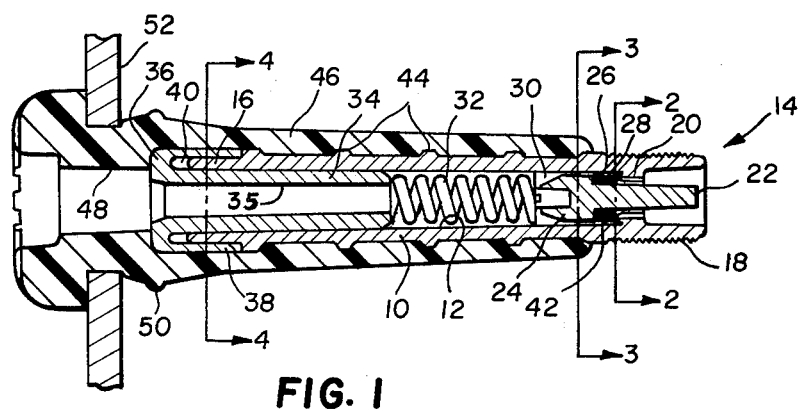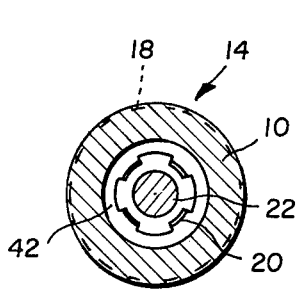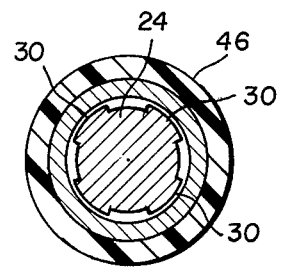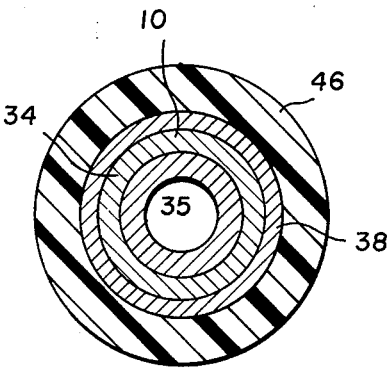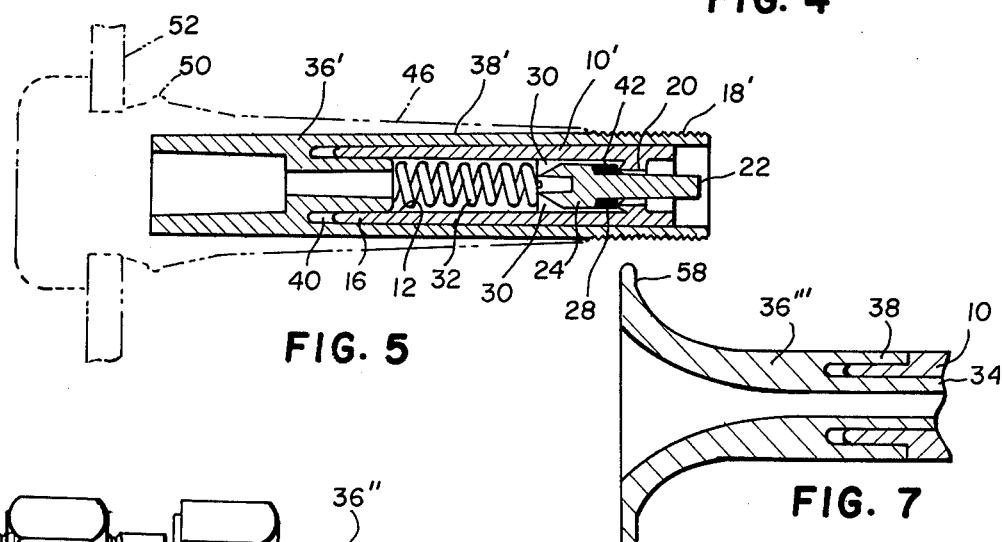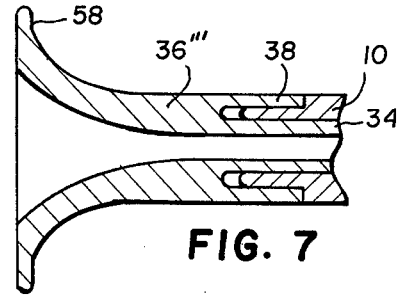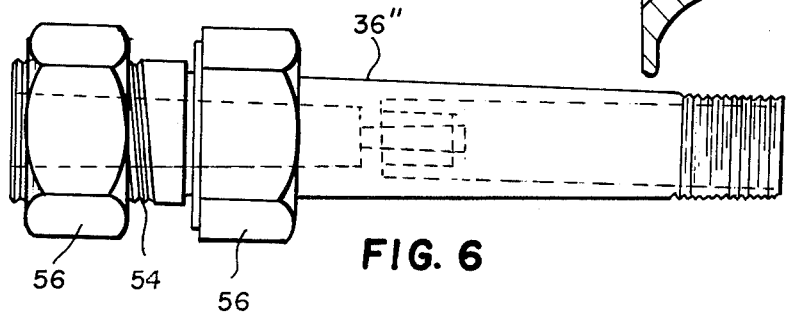

4,171,119

FLUID FLOW VALVE STEM

BACKGROUND OF THE INVENTION

1. Field of the Invention

This invention relates generally to valves, and more specifically to an improved integral fluid flow valve stem.

2. Description of the Prior Art

It is known in the prior art to provide a fluid flow valve stem comprising a sleeve having an internally threaded mouth by means of which a valve core may be retained in sealing engagement with a valve seat formed inwardly of the mouth. A disadvantage of such a fluid valve, of which U.S. Pat. No. 3,712,326 is exemplary, is that the valve core is a separate unit of complicated design and construction which is screwed into the valve stem. The valve core has a first seal member for engaging the valve seat of the stem to provide a permanent seal therebetween. In addition, the valve core has a valve seat of its own and a second seal member movable by a plunger relative to its valve seat between open and closed positions.

It is also known in the prior art as exemplified by U.S. Pat. No. 2,822,817 to provide a filler valve having a sleeve to which a reciprocally movable valve seal member is permanently secured. A disadvantage of this filler valve is its increased cost of manufacture due to the necessity of costly machining operations and the requirement of one or more sub-assembly operations. In addition, a costly final assembly operation of the filler valve is required in which a hollow stop member is inserted in the sleeve, depressed against a spring to a position past an internal retaining groove in the sleeve, and a retaining ring mounted in the groove.

SUMMARY OF THE INVENTION

In accordance with preferred embodiments of the invention, an improved fluid flow valve stem is disclosed which is of simple design and construction and economical to manufacture. The valve stem comprises a minimum of parts, many of which can be molded out of any suitable plastic material, and all of which can be assembled and/or molded along a single continuous assembly line.

The improved valve stem essentially comprises a sleeve having a central passage and an internal annular valve seat. Plunger means are provided including a valve seal member mounted for reciprocal movement in the sleeve between a normal closed position in which the seal member sealingly engages the valve seat and an open position in which fluid can pass through the valve seat and sleeve passage. An end cap is secured to one end of the sleeve by a vacuum lock and has a passage in fluid communication with the sleeve passage. Resilient means mounted in the sleeve passage between the end cap and the plunger means biases the plunger means to its normal closed position.

In a more specific aspect of the invention, the end cap has an annular blind bore for receiving one end of the sleeve in an interference fit for securing the end cap to the sleeve by a vacuum lock. The function of the end cap is to keep the valve assembly comprising the sleeve, plunger means, resilient means and end cap together as a unit.

In another specific aspect of the invention, the sleeve is frusto-conically shaped with the end cap end of the sleeve of greater outside diameter than the free end of the sleeve.

The invention and its advantages will become more apparent from the detailed description of the preferred embodiments presented below.

BRIEF DESCRIPTION OF THE DRAWING

In the detailed description of the preferred embodiments of the invention presented below, reference is made to the accompanying drawing, in which:

FIG. 1 is a side elevational view in section of the improved valve stem of this invention;

FIG. 2 is a section view taken along line 2—2 of FIG. 1.

FIG. 3 is a section view taken along line 3—3 of FIG. 1;

FIG. 4 is a section view taken along line 4—4 of FIG. 1;

FIG. 5 is a view similar to FIG. 1 showing another embodiment of the invention;

FIG. 6 is a side elevational view of still another embodiment of the invention; and FIG. 7 is a segmental view in section showing a modified end cap for use in this invention.

DESCRIPTION OF THE PREFERRED EMBODIMENTS

With reference to FIG. 1, a preferred embodiment of the valve stem of this invention comprises a frusto-conically shaped sleeve 10 having a central fluid passageway 12 extending therethrough. The sleeve 10 has a smaller diameter at its free end 14 than its base end 16, and further has an external thread 18 on its free end for receiving a screw-on valve cap of known type, not shown. If desired, the valve cap may be formed integral with the valve stem by a living hinge and pressed onto free end 14.

The sleeve 10 is provided along its inner periphery and adjacent its free end 14 with a guide bore 20 for guiding a plunger pin 22 for reciprocal movement. The enlarged base 24 of plunger 22 is reciprocally guided within central passageway 12 and defines an annular shoulder 26 where pin 22 and base 24 merge for receiving an annular seal member 28. The plunger base 24 has a plurality of circumferentially spaced ribs 30 (FIG. 3), the ends of which are engageable with one end of a helical spring 32. The opposite end of spring 32 abuts the end of an inner tubular portion 34 of an end cap 36 adapted to slide with a slight friction fit into central passageway 12. Tubular portion 34 has an inner passageway 35 in fluid communication with passageway 12. The end cap 36 has an outer tubular portion 38 spaced from inner tubular portion 34 to define an annular blind bore 40 for receiving base end 16 of sleeve 10 with a slight interference fit when the two parts are mated, and creating a vacuum lock for securing end cap 36 to sleeve 10. In this assembled position as seen in FIG. 1, spring 32 is slightly compressed for biasing plunger 22 into its closed position in which seal member 28 is moved into fluid sealing engagement with an annular valve seat 42 at one end of guide bore 20.

A fluid such as air is introduced through the valve stem into a vessel such as a tire by an air hose of known type, not shown, having a cup-shaped head adapted to be pressed onto the free end of the valve stem. The head has a central valve pin which when depressed releases pressurized air through the hose. The valve pin initially depresses plunger pin 22 to a fixed open position in which seal member 28 is retracted from valve seat 42 and spring 32 is fully compressed causing pin 22 to bottom. Further downward movement of the air hose head while pin 22 is in its bottomed open position causes the valve pin to be depressed for releasing air from the air hose into the tire.

The sleeve 10 is provided with a roughened outer periphery such as spaced ribs 44, and the end cap-sleeve assembly is encapsulated in any suitable coating 46 of polymeric material which strongly adheres to spaced ribs 44. The coating 46 has an opening 48 in alignment with the passageways 12, 35 in the sleeve and end cap 10, 36 respectively. The coating 46 has an enlarged skirt 50 which can be compressed and forced past an opening in a support plate such as a wheel plate 52 for securing the valve stem to the wheel as seen in FIGS. 1 and 5.

With reference to the valve stem illustrated in FIG. 5, a shortened sleeve 10' is used which is provided with a smooth outer periphery. An end cap 36' is provided having an extended outer tubular portion 38' for receiving the entire sleeve. The free end of tubular portion 38' is threaded on its outer periphery at 18' for receiving a valve cap. The remaining parts are substantially identical to parts disclosed in FIGS. 1-4 and are denoted by the same numerals.

With reference to FIG. 6, a rigid end cap 36" is provided which also forms the outer body of the valve stem. The end cap 36" is provided with outer threads 54 and nuts 56 for securing the valve stem to any suitable vessel or the like. The sleeve, plunger and spring, not shown, could be substantially identical to the parts shown in FIG. 5.

With reference to FIG. 7, an end cap 36''' is shown having an annular flange 58 designed for use with an inner tube or the like in which the flange is secured by a molding operation or the like directly to the tube.

The invention has been described in detail with particular reference to preferred embodiments, but it will be understood that variations and modifications can be effected within the spirit and scope of the invention as described hereinabove.

What is claimed is:

1. A flow control valve stem for a fluid or the like comprising:
   - a sleeve having a first passage extending therethrough, a mouth at one end of said sleeve, and an internal annular valve seat on said first passage;
   - a plunger mounted in said first passage for reciprocal movement and having a free end, an opposite end and a valve seal member interposed therebetween, said plunger further being reciprocally movable by manual movement of said free end between a normal closed position in which said valve seal member engages said annular valve seat to prevent the passage of fluid through said first passage, and an open position in which fluid can pass through said valve seat and said first passage;
   - an end cap having inner and outer tubular portions defining an annular blind bore for receiving said opposite end of said sleeve in an interference fit for rigidly securing said end cap to the opposite end of said sleeve by a vacuum lock, said end cap further having a second passage extending therethrough in fluid communication with said first passage; and
   - resilient means mounted in said first passage and interposed between said end cap and said plunger for biasing said plunger to said normal closed position.

2. The fluid flow control valve of claim 1, and further comprising an outer polymeric body bonded to the outer surfaces of said sleeve and said outer tubular portion.

3. The fluid flow control valve of claim 1 wherein said sleeve is frusto-conically shaped with said opposite end of said sleeve of greater outside diameter than said one end of said sleeve.

* * * * *